I'll Illlll II lllll lllllllll llllll lll II II Ill lllll lllll lllll 111111111111111111
US009372590B2

(12) United States Patent (10) Patent No.: US 9,372,590 B2
Zaman et al. (45) Date of Patent: Jun. 21, 2016

(54) MAGNIFIER PANNING INTERFACE FOR NATURAL INPUT DEVICES

(75) Inventors: Nazia Zaman, Bellevue, WA (US); Paul J. Reid, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1116 days.

(21) Appl. No.: 12/238,465

(22) Filed: Sep. 26, 2008

(65) Prior Publication Data

US 2010/0083186 A1 Apr. 1, 2010

(51) Int. Cl.
*G06F 3/0481* (2013.01)
(52) U.S. Cl.
CPC .... *G06F 3/0481* (2013.01); *G06F 2203/04805* (2013.01)
(58) Field of Classification Search
CPC .................. G06F 2203/04804; Y02B 70/126; H02M 1/4225; H02M 3/156; H02M 5/29
USPC ................... 715/769, 800, 831; 345/157, 163
See application file for complete search history.

(56) References Cited

U.S. PATENT DOCUMENTS

| 6,073,036 | A | 6/2000 | Heikkinen et al. |
| 6,118,888 | A | 9/2000 | Chino et al. |
| 6,946,672 | B1 | 9/2005 | Lapstun et al. |
| 7,103,852 | B2 | 9/2006 | Kairis, Jr. |
| 7,213,214 | B2 * | 5/2007 | Baar et al ...................... 715/801 |
| 7,216,034 | B2 | 5/2007 | Vitikainen et al. |
| 7,327,349 | B2 | 2/2008 | Robbins et al. |
| 7,884,805 | B2 * | 2/2011 | Thorn ........................... 345/173 |
| 8,176,438 | B2 | 5/2012 | Zaman et al. |
| 2003/0214519 | A1 | 11/2003 | Smith et al. |
| 2004/0172191 | A1 | 9/2004 | Vitikainen et al. |
| 2004/0196267 | A1 * | 10/2004 | Kawai et al. ................... 345/173 |
| 2005/0001815 | A1 | 1/2005 | Tsunoda |
| 2005/0262447 | A1 | 11/2005 | Shoemaker |
| 2005/0288934 | A1 | 12/2005 | Omi |
| 2006/0022955 | A1 | 2/2006 | Kennedy |
| 2006/0026521 | A1 | 2/2006 | Hotelling et al. |
| 2006/0026535 | A1 | 2/2006 | Hotelling et al. |
| 2006/0149550 | A1 | 7/2006 | Salminen |
| 2007/0013722 | A1 * | 1/2007 | Souza ........................... 345/660 |
| 2007/0033543 | A1 | 2/2007 | Ngari et al. |
| 2007/0124507 | A1 | 5/2007 | Gurram et al. |

(Continued)

OTHER PUBLICATIONS

"Handling Touch, Pen or Mouse Digitizer input in your .NET Application", Todd Landstad, Mar. 20, 2007, CodeProject.*

(Continued)

*Primary Examiner* — Namitha Pillai
(74) *Attorney, Agent, or Firm* — Tim Churna; Judy Yee; Micky Minhas

(57) ABSTRACT

A magnifier movement system is described herein that provides a more user-friendly experience for users of natural input devices when moving the magnifier and interacting with magnified user interface elements. The system receives an indication that a user has touched the screen with a natural input device at a particular location. The system displays a drag control for moving the magnifier, but does not move the magnifier unless the user selects the drag control and moves the natural input device. If the drag control is unselected and the system receives additional natural input, then the system passes the input on to the magnified application. Thus, the magnifier movement system provides a more satisfying user experience for users of natural input-based computer systems and screen magnifiers.

20 Claims, 6 Drawing Sheets

(56) References Cited

U.S. PATENT DOCUMENTS

| | | |
|---|---|---|
| 2007/0257891 A1 | 11/2007 | Esenther et al. |
| 2008/0062202 A1 | 3/2008 | Schulz et al. |
| 2008/0065386 A1 | 3/2008 | Cross et al. |
| 2008/0082909 A1 | 4/2008 | Zuverink et al. |
| 2008/0165161 A1 | 7/2008 | Platzer et al. |
| 2008/0165210 A1 | 7/2008 | Platzer et al. |
| 2008/0168402 A1 | 7/2008 | Blumenberg |
| 2009/0241059 A1 | 9/2009 | Moore et al. |
| 2013/0019200 A1* | 1/2013 | Montague ............... 715/800 |

OTHER PUBLICATIONS

Ramos, et al., "Pointing Lenses: Facilitating Stylus Input through Visual- and Motor-Space Magnification", Retrieved at <<http://www.cosc.canterbury.ac.nz/andrew.cockburn/papers/pointingLens.pdf>>, CHI 2007, pp. 11.

Yue, et al., "Principles and Practice of Improving Web Interaction on Small-Screen Terminals", Retrieved at <<http://www.graphics.pku.edu.cn/papers/download/Principles%20and%20Practice%20of%20Web%20Interaction%20on%20Small-Screen%20Terminals.pdf>>, pp. 6.

"Mobile Magnifier Pocket", Retrieved at <<http://www.accessingenuity.com/mobile-magnifier-pocket>>, Jun. 19, 2008, p. 1.

Forlines, et al., "Zoom-and-Pick: Facilitating Visual Zooming and Precision Pointing with Interactive Handheld Projectors", Retrieved at <<http://www.dgp.toronto.edu/papers/cforlines_UIST2005.pdf>>, UIST'05, Oct. 23-27, 2005, Seattle, Washington, USA., pp. 73-82.

Gorostiza, et al., "Multimodal Human-Robot Interaction Framework for a Personal Robot", Retrieved at<<http://66.102.1.104/scholar?hl=en&lr=&q=cache:p559-X4mbqYJ:roboticslab.uc3m.es/publications/2006%2520RO-MAN%2520Javi.pdf+>>, pp. 1-7.

Larson, et al., "W3C Multimodal Interaction Framework", Retrieved at<<http://www.w3.org/TR/mmi-framework/>>, W3C Note, May 6, 2003, pp. 1-23.

Milekic, Slavko, "Interactive Surfaces for Knowledge Dissemination", Retrieved at <<http://www.ichim.org/ichim04/contenu/SARLE/Gesture%20Gallery/interactiveSurfacesICHIMI.doc>>, Nov. 3, 2003, pp. 10.

Non-Final Office Action mailed Jun. 23, 2011 in U.S. Appl. No. 12/238,464, 15 pages.

Notice of Allowance mailed Feb. 1, 2012 in U.S. Appl. No. 12/238,464, 8 pages.

Spillers, Frank, "Multi-Modal Design: Gesture, Touch and Mobile Devices . . . Next Big Thing?", Retrieved at<<http://experiencedynamics.blogs.com/site_search_usability/2007/06/multimodal_desi.html>>, Jun. 2007, pp. 3.

\* cited by examiner

MAGNIFIER PANNING INTERFACE FOR NATURAL INPUT DEVICES

BACKGROUND

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world. Applications often do not know they are running on a tablet PC, and the operating system may attempt to provide input to applications that appears similar to mouse input. This can cause several problems for screen magnifiers used in conjunction with tablet PCs or other touch-based interface devices.

Screen magnifiers are a type of assistive technology used by visually impaired people with some functional vision. By magnifying areas of the screen, the screen magnifier allows people that would otherwise not be able to see areas of the screen that are too small to enlarge these areas. Screen magnifiers are software applications that present a computer's graphical output in an enlarged form. Many screen magnifiers act similar to a physical magnifying glass that a user can move around over the screen to magnify a specific area, except rather than a physical object the screen magnifier is software and the user moves the displayed glass or lens with the mouse or other input device. The most common method of magnification is to present an enlarged view of a portion of the original screen content that covers a portion of or the entire screen. The enlarged view often tracks the pointer or cursor as the user moves a mouse or other input device around the screen so that the user can magnify different areas. Screen magnifiers may work with a single application or across multiple applications at the operating system level. For example, Microsoft Windows Vista includes a magnifier application for magnifying the entire desktop and any applications displayed on it.

Because the view is enlarged, screen magnifiers provide a way to move the lens, or magnified area, to different areas of the desktop or application. For example, at a magnification factor of 4 times (4×), only one-eighth of the desktop can be shown in a full screen magnifier at a time. Thus, to see the other three-fourths of the desktop a user moves the magnified area around in a process called panning. Although panning often refers only to horizontal movement (and scrolling or other terms refer to vertical movement), panning and movement as used herein refer to movement of the magnified view in any direction, whether horizontally, vertically, or diagonally.

It is easy to move a screen magnifier in response to mouse input, because a mouse moves continuously from one point of the screen to another. For example, as user cannot move the cursor with a mouse from the lower left of the screen to the upper right of the screen without passing through the points in between. The same is not true of a natural input device like a digital pen or touch input. The user can pick up the natural input device at one location and set it down again at a location far from the original location. The cursor often jumps from place to place as the user picks up and sets down the digital pen. This makes the experience of moving a screen magnifier that is following the cursor very disconcerting because the magnification of the screen contents makes the jump feel even larger as more pixels scroll across the screen very quickly. In addition, for quick touches the operating system may not even send a hover or other message that indicates the cursor's new position, so that the magnifier does not move. The user can become disoriented and not know what part of the desktop or application the user is viewing after repeatedly picking up and setting down the pen.

In addition, if the user is trying to click on an item displayed in the UI (e.g., a file in a file management application) using a digital pen and the screen magnifier is jumping to align with the new pen location, then it can make it difficult for the user to select the intended item. This can lead to the user selecting the wrong item or simply being confused. Some screen magnifiers do not alter input such that a user must actually click at an item's original location to select the item, not necessarily where the item appears in the magnifier. If the user is trying, for example, to drag a file from one side of the magnifier lens to the other (or from within the magnifier lens to a folder or other location outside of the lens), the user may miss selecting the target item that the user intended.

SUMMARY

A magnifier movement system is described herein that provides a more user-friendly experience for users of natural input devices when moving the magnifier and interacting with magnified user interface elements. The system receives an indication that a user has touched the screen with a natural input device at a particular location. The system displays a drag control for moving the magnifier, but does not move the magnifier unless the user selects the drag control and moves the natural input device. If the drag control is unselected and the system receives additional natural input, then the system passes the input on to the magnified application. Thus, the magnifier movement system provides a more satisfying user experience for users of natural input-based computer systems and screen magnifiers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A magnifier movement system is described herein that provides a more user-friendly experience for users of natural input devices when moving the magnifier and interacting with magnified user interface elements. The system receives an indication that a user has touched the screen with a natural input device at a particular location. For example, the user may set a finger or stylus down on a touch screen. The system displays a drag control for moving the magnifier, but does not move the magnifier in response to receiving the indication. For example, the system may display a "gripper" at the edge of the magnifier window or display a title bar that the user can grab. If the user selects the drag control and moves the natural input device, then the system moves the magnifier window to magnify a different area of the screen. For example, the user may click on the "gripper" and move the magnifier window to a new location by dragging the stylus. If the drag control is unselected and the system receives additional natural input, then the system passes the input on to the magnified application. For example, the system allows the user to click on items within the magnifier window without the magnifier window jumping around. Thus, the magnifier movement system provides a more satisfying user experience for users of natural input-based computer systems and screen magnifiers.

Figure 1:
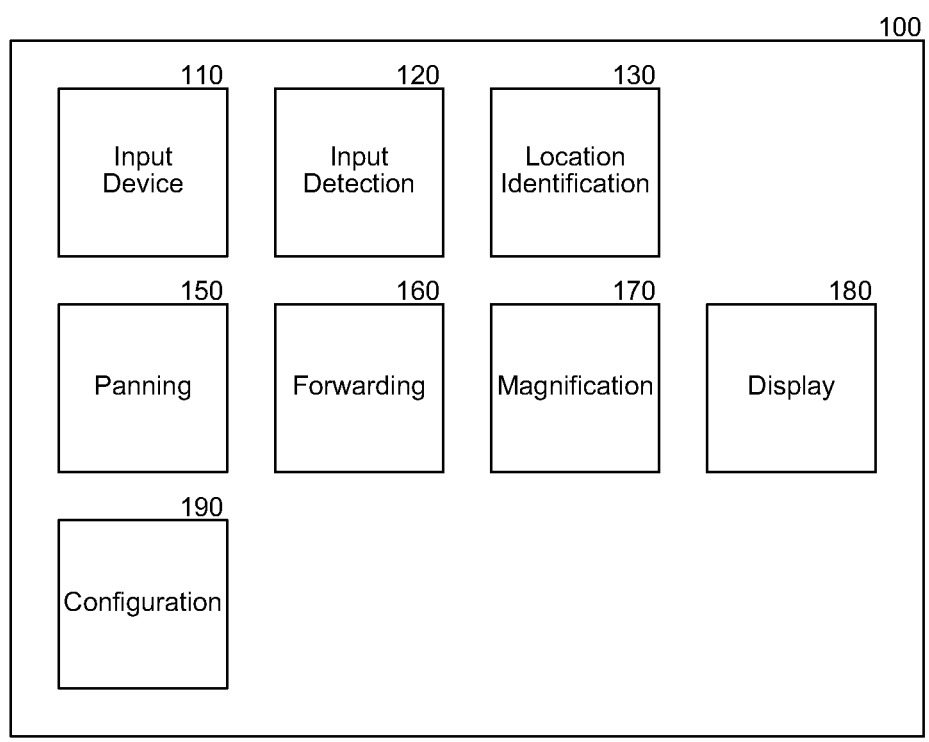
FIG. 1 is a block diagram that illustrates the components of the magnifier movement system, in one embodiment.

FIG. 1 is a block diagram that illustrates the components of the magnifier movement system, in one embodiment. The magnifier movement system 100 includes at least one input device 110, an input detection component 120, a location identification component 130, a panning component 150, a forwarding component 160, a magnification component 170, a display 180, and a configuration component 190. Each of these components is described in further detail herein.

The input device 110 receives input from a user and communicates the input to an operating system. The input device can be a variety of devices such as a stylus, digital pen, mouse, or even the user's finger moving over a touch screen. When the system 100 receives a mouse message (e.g., WM_LBUTTONDOWN), it may call the Win32 API GetMessageExtraInfo to evaluate whether the message originated from a pen or a mouse device. Win32 provides a macro IsPenEvent that masks the value returned from GetMessageExtraInfo to determine the type of input received. If the macro returns true, then a pen or touch screen generated the message. Otherwise, a mouse device generated the message.

The input detection component 120 converts the received input into coordinates of a displayed cursor. When a user moves the input device 110, the input detection component 120 moves the displayed cursor. The location identification component 130 identifies one or more user interface elements present at a current location of the displayed cursor. For example, the location identification component 130 may determine that the current location of the cursor is over a drag control displayed by the system 100 that the user can select with the input device 110 and move the magnification window. As another example, the location identification component 130 may determine that the current location of the cursor is over a user interface element in the magnified view that is an enlarged version of an element on the original desktop. For example, the user may select a folder displayed in the magnified view that is displayed by a file management application (e.g., Microsoft Windows Explorer).

The panning component 150 pans an area of the display that the magnification system is magnifying when the user selects the drag control. The panning component stores the coordinates of the display area that the system is currently magnifying and modifies the coordinates based on movement after the user selects the drag control to pan the magnified area.

The forwarding component 160 passes received user input to the identified user interface elements when the user has not selected the drag control. For example, the forwarding component 160 may pass along clicks of a mouse or taps of a stylus to buttons or other user interface elements. The forwarding component 160 may pass these messages as standard messages familiar to the application, such as a mouse button down message (e.g., WM_LBUTTONDOWN on Microsoft Windows). The forwarding component 160 may modify the coordinates received from the input detection component 120 so that the user's click is sent to the user interface element that was displayed at the location the user clicked in the magnified area rather than any user interface element present at the cursor location beneath the magnified window.

The display 180 displays a graphical representation of one or more applications and a magnified view of at least a portion of the graphical representation. For example, the display 180 may display a desktop of the operating system and applications that are currently running as windows on the desktop. The user may select an area of the graphical representation that the system 100 will magnify by panning the magnified area. The magnification component 170 generates the magnified view from a selected area of the graphical representation. When the user pans the magnified area, the panning component 150 provides the coordinates of the new area to be magnified to the magnification component 170, and the magnification component performs graphical operations, such as a stretch blit, to display a larger than usual view of the selected area.

The configuration component 190 receives configuration information from the user. For example, the user may turn on cursor tracking so that the system 100 pans the magnified area based on the user's clicks and does not wait for the user to select the drag control.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
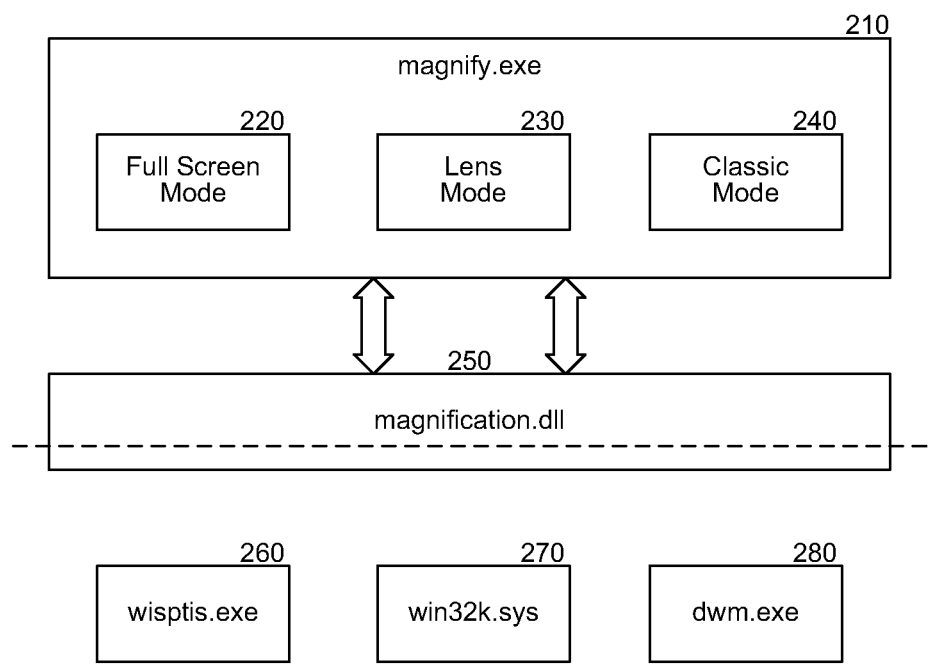
FIG. 2 is a block diagram that illustrates a Microsoft Windows-based operating environment of the magnifier movement system, in one embodiment.

FIG. 2 is a block diagram that illustrates a Microsoft Windows-based operating environment of the magnifier movement system, in one embodiment. The system includes an executable file 210, a supporting dynamic-link library 250, and three modules provided by the operating system, wisptis.exe 260, win32k.sys 270, and dwm.exe 280. The executable file 210, called magnify.exe, creates the process that controls the user interface and provides the end-to-end user experience. The magnifier.exe process controls the magnification, keeps track of input events, and moves the magnified view accordingly. The executable file 210 may provide three modes, full-screen mode 220, lens mode 230, and legacy mode 240. The full-screen mode 220 projects a magnified version of the user's desktop on the display device. One can picture it as a huge magnifier lens that covers the entire display. The lens mode 230 displays a magnified view of the desktop in a window that is smaller than the size of the display. This mode acts more like a traditional physical magnifying glass that a user can move around the desktop. The legacy mode 240 provides magnification with reduced functionality, such as when certain operating system services (e.g., dwm.exe) are not available. For example, during logon Microsoft Windows does not provide access to certain services to applications.

The dynamic-link library 250, magnification.dll, provides an application-programming interface (API) exposed to internal and external magnification controllers. The executable file 210 magnify.exe and other applications call this API to request various magnification services. The dynamic-link library 250 acts as a proxy between the magnification controller, the kernel-mode state for the magnification context, and the desktop compositor.

Win32k.sys 270 is a kernel-mode driver that handles the bulk of the Win32 API on Microsoft Windows. Win32k.sys 270 includes a Raw Input Thread (RIT) that handles input processing for the magnifier movement system. Win32k.sys 270 also handles security and context control. Dwm.exe 280 provides the DWM process that keeps track of application and other windows. Dwm.exe 280 handles the output compositing and magnification for the magnifier movement system. Wisptis.exe 260 is responsible for input to a tablet via a stylus or touch and consumes input transformation functions provided by Win32k.sys 270 to transform absolute clicking to work in magnified contexts (e.g., what you see is what you click).

Figure 3:
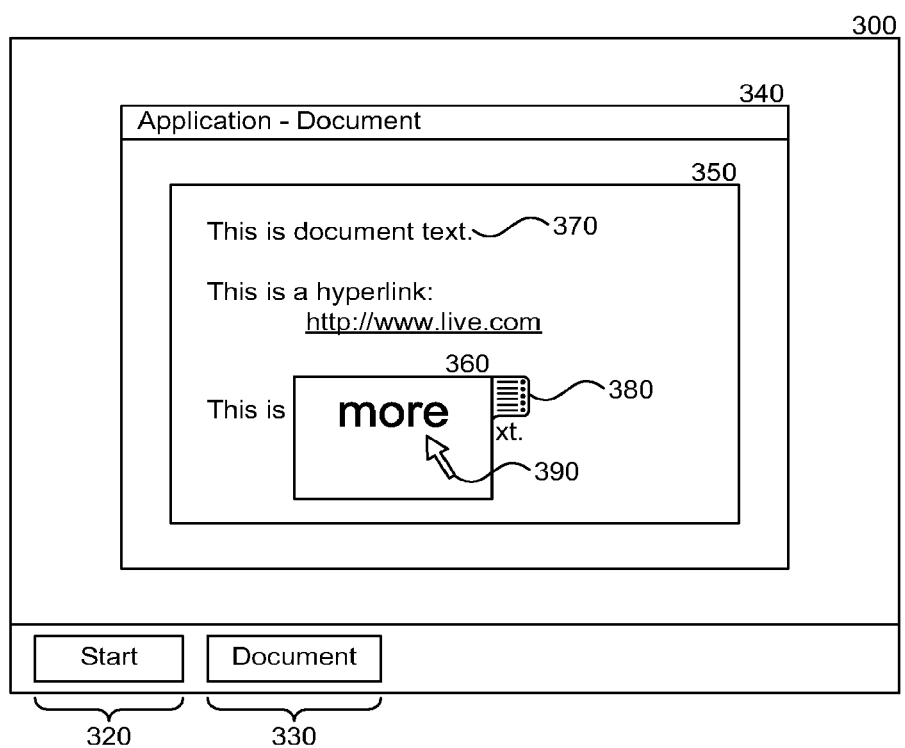
FIG. 3 is a display diagram that illustrates an operating environment of the magnification system, in one embodiment.

FIG. 3 is a display diagram that illustrates an operating environment of the magnification system, in one embodiment. The environment includes a typical desktop 300 that contains an operating system menu 320, a button 330 for activating one or more running applications, and one or more application windows, such as application window 340. The application window 340 illustrates a typical document-based application (e.g., Microsoft Word or Microsoft Internet Explorer) that contains a document display area 350. The document display area 350 contains text 370 or other user interface elements that are meaningful to the application. The desktop 300 also includes a magnified view 360 that displays a portion of the desktop 300 or application window 340 at a larger than normal size. For example, the sentence under the magnified view 360 says, "This is more text," and the magnified view 360 shows a larger than normal display of the word "more." Note also that the magnified view 360 occludes portions of the application window 340 as described herein, such that the letters "te" of the word "text" are not visible. The magnified view 360 contains a drag control 380 that the user can select to move the magnified view 360 to a different area of the desktop 300 or application window 340. If the user clicks or touches the display while the cursor 390 is over the magnified view 360, the magnifier movement system 100 will pass the user's selection along to the user interface element displayed in the magnified view 360. For example, if the user clicks the word "more," then the application window 340 will behave as if that is what the user clicked rather than responding to whatever is actually under the cursor 390 in the application window 340 below the magnified view 360. When the user has not selected the drag control 380, the system 100 keeps the magnified view 360 in the same place so that the user can interact with the magnified area in a more natural way.

Figure 4:
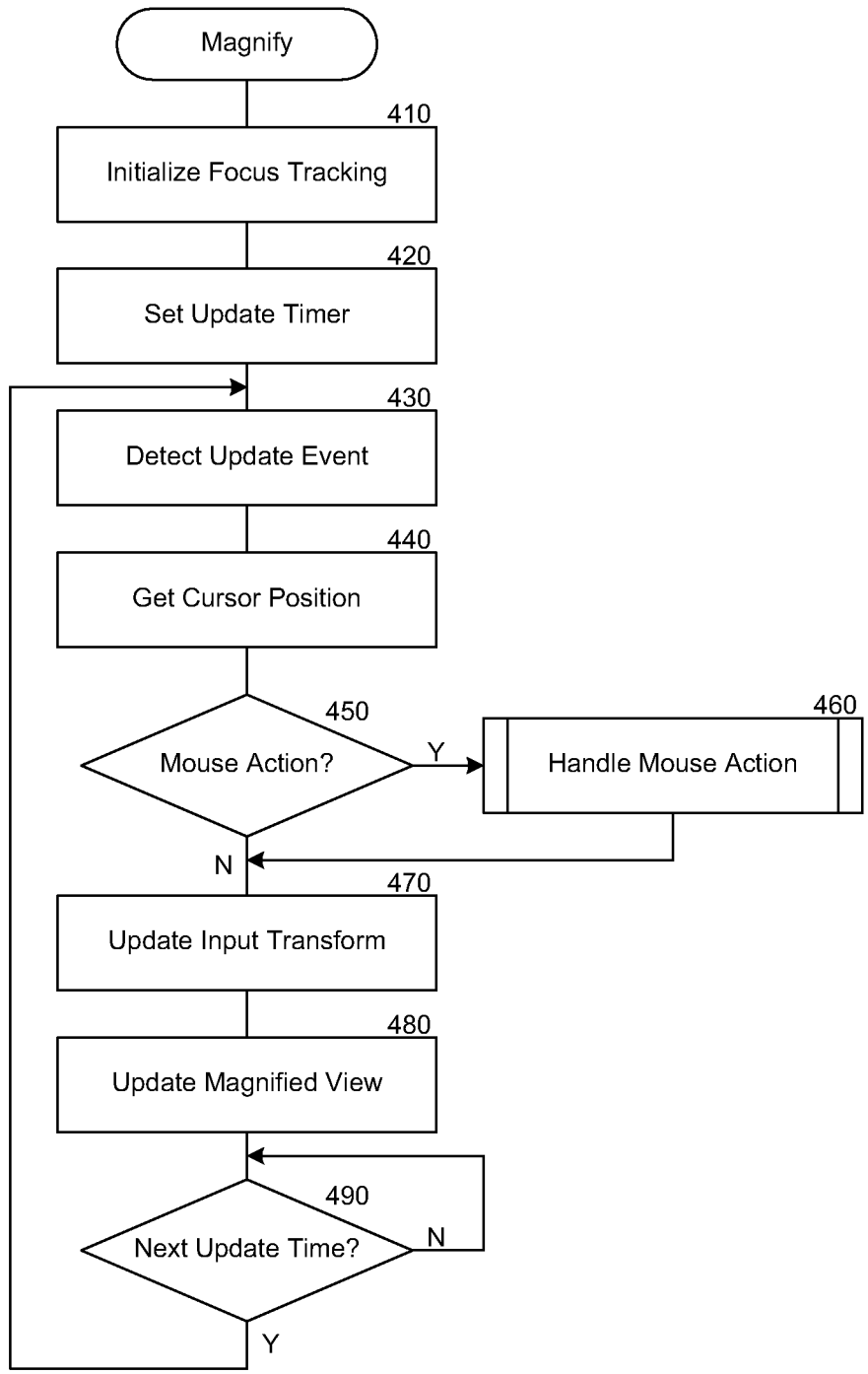
FIG. 4 is a flow diagram that illustrates the processing of the system to magnify an area of the screen, in one embodiment.

FIG. 4 is a flow diagram that illustrates the processing of the system to magnify an area of the screen, in one embodiment. In block 410, the system initializes focus tracking so that the magnified view can follow the focus if desired by the user. For example, the user may want the system to magnify whatever user interface elements (e.g., menu's buttons and so on) have the focus at any given time. In block 420, the system starts an update timer that fires to kick off an update of the position and contents of the magnified view. For example, the update timer may fire every 15 ms and modify the magnified view based on actions initiated by the user since the last update. This step is optional and may not occur if the system is operating based on events rather than a timer. For example, for mouse movements the system can use a low-level mouse hook to detect mouse events. For focus tracking the system can use WinEvents (e.g., via SetWinEventHook) or other methods provided by the operating system. In block 430, the system detects an update event, such as expiration of the timer described, or in some cases, user actions trigger updates. For example, the system may receive a notification that the timer has fired. In block 440, the system retrieves the current cursor position. For example, the system may call an operating system API (e.g., GetCursorPos) to retrieve the location of the cursor.

In decision block 450, the system determines whether the user has interacted with the input device (e.g., a mouse click or pen tap at a location near the magnified area. For example, if the user set the pen down at the edge of the magnified area, the pen may be over the drag control. If the user interacted with the input device at an area near the magnified area, then the system continues at block 460, else the system continues at block 470. In block 460, the system handles the mouse or other action as described further with reference to FIG. 5. In block 470, the system updates the input transform. For example, the system may retrieve the contents of the screen that the magnified view is to magnify. In block 480, the system updates the magnified view. For example, the system may keep the magnified view in the right place and at the right zoom level. In decision block 490, the system determines if the next update interval has started based on the update timer or user actions. If it is time for the next update interval, the system loops to block 430 to handle the next update, else the system waits for an update event.

Figure 5:
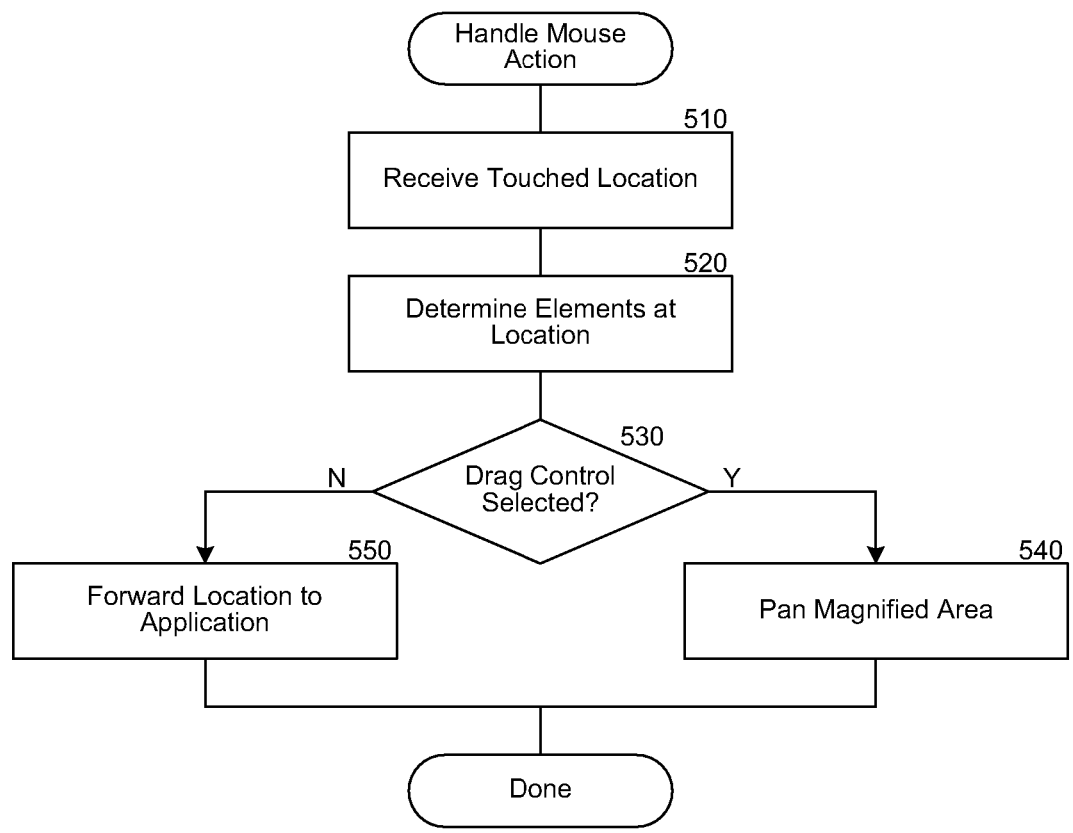
FIG. 5 is a flow diagram that illustrates the steps performed by the components of the system to respond to a user mouse action associated with the magnified area, in one embodiment.

FIG. 5 is a flow diagram that illustrates the steps performed by the components of the system to respond to a user mouse action associated with the magnified area, in one embodiment. In block 510, the system receives a location of the desktop touched by a touch-based input device, such as a digital pen. For example, a user may tap a button or empty area of a desktop displayed on a touch screen. In block 520, the system determines whether the touched location contains a user interface element. For example, the touched location may contain a drag control or magnified user interface elements, such as a file, hyperlink, list box, toolbar button, or other user interface element. In decision block 530, if the touched location contains the drag control, then the system continues at block 540, else the system continues at block

550. In block 540, if the touched location contains the drag control, the system pans a magnified portion of the display based on user movement of the touch-based input device. For example if the user sets a stylus down on the drag control and drags to the right, then the system pans the magnified view to the right. In block 550, if the touched location does not contain the drag control, then the system forwards the touched location to the application (or operating system if the magnifier is not over an application). For example, if the user clicked on a button, then the system forwards to the click to the button for processing. The system may modify the coordinates as described herein to convey the user's intended click location to the application. After block 550, these steps conclude.

In some embodiments, the magnifier movement system gives a sense of elasticity when moving the magnifier. For example, even when the system suspects that the user is attempting to move the magnifier, the magnifier may pause at the current location for a few seconds to be sure of the user's intentions. This also gives a feeling of steadiness to the magnifier window so that if the user is trying to drag a file or interact with a user interface item in some other way, the magnifier window does not jump around and thwart the user's purpose.

In some embodiments, the magnifier movement system prevents the user from clicking on occluded items without moving the magnifier window. When the system is displaying a magnifier lens on a user's desktop, the magnifier window occludes a portion of the desktop so that a portion is not visible around or in the magnifier window. This is because if the magnifier window is set, for example, at 4 times (4×) magnification, then only one-eighth (⅛) of the screen area occluded by the magnifier window is actually shown in the magnifier window due to the magnification. Traditional screen magnifiers behave as if the magnifier window is not there, such that whatever user interface item is under the cursor when a user clicks is the item that receives the click. The magnifier movement system however modifies the user's input so that the user interface item displayed in the magnifier window when a user clicks is the user interface item that receives the click, regardless of what item is actually under the cursor beneath the magnifier window. This produces an effect that is more aligned with the user's expectations and makes working within a magnified window more natural.

In some embodiments, the magnifier movement system automatically displays the drag control when the system detects natural input. For example, the system may not display the drag control for mouse or keyboard navigation, but when the system detects that the user has tapped the screen with a pen or finger, the system may display the drag control. The system may display the drag control at an edge of the magnifier window or any other location that conveys its purpose to the user.

In some embodiments, the magnifier movement system automatically positions the drag control based on the location of the magnifier window. The magnifier movement system may default to a particular position for the drag control. For example, the system may display the drag control at the upper right of the magnifier window by default. Sometimes the default position of the drag control would be difficult for the user to select or not even visible. For example, if the system positions the magnifier window at the far right edge of the desktop and the drag control is on the upper right, then the drag control may be off the desktop and not visible. In such cases, the magnifier movement system repositions the drag control. For example, the system may place the drag control at the upper left instead of the upper right.

In some embodiments, the magnifier movement system stores configuration information that a user can modify to alter the behavior of the system. For example, the user may be able to select the duration described herein for the elasticity of moving the window. As another example, the user may be able to configure where the system positions the drag control by default. The system may also allow the user to turn off the drag control and have the magnifier window follow the cursor. In some embodiments, the user can configure how long the system displays drag control. For example, the system may display the panning control when natural input is detected, and fade out or remove the control some time later (e.g., 10 seconds) if the system does not receive additional natural input.

Figure 6:
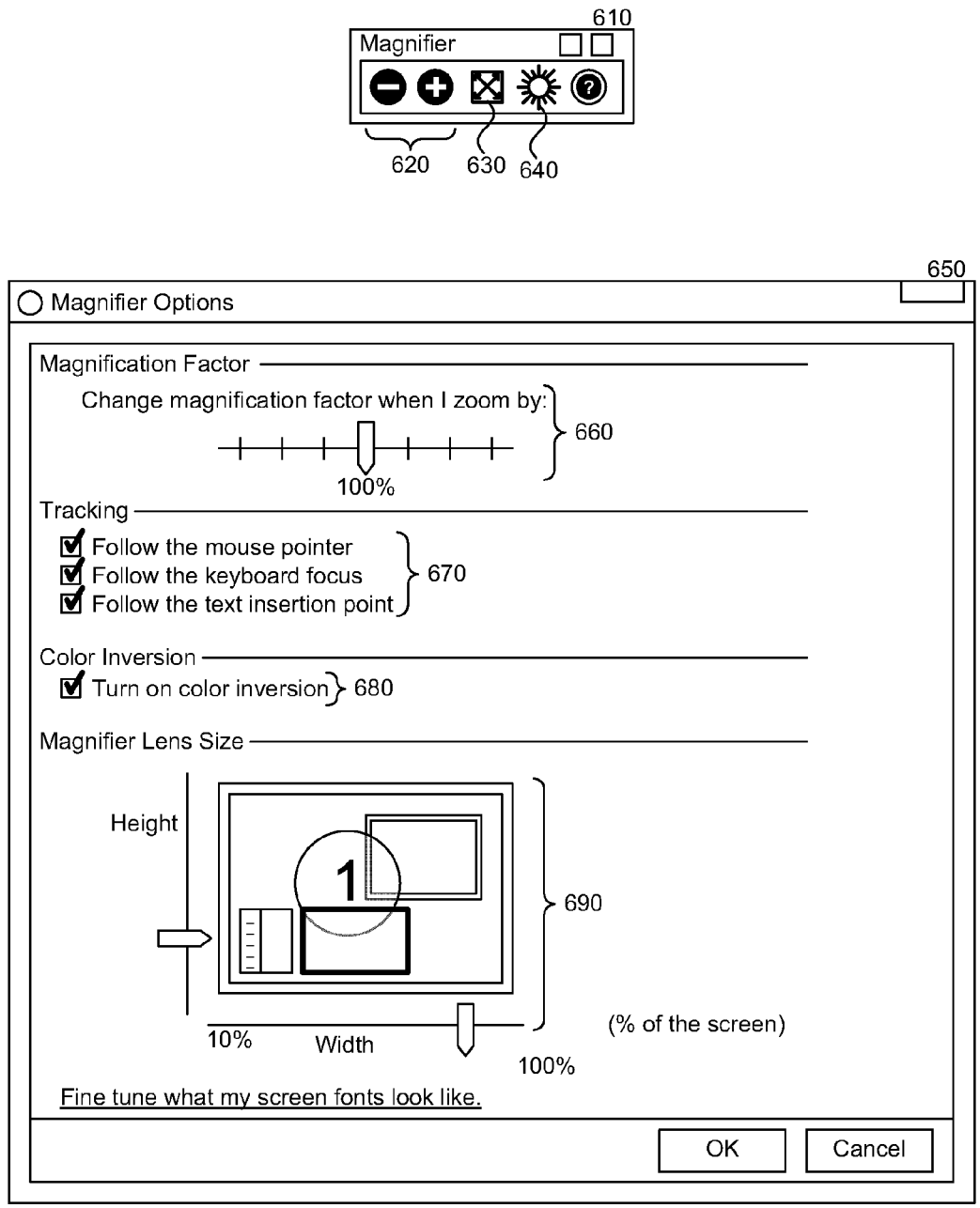
FIG. 6 is a display diagram that illustrates displays produced by the system for receiving configuration information from a user, in one embodiment.

FIG. 6 is a display diagram that illustrates displays produced by the system for receiving configuration information from a user, in one embodiment. The display 610 is a toolbar that the system may display when the system is currently magnifying a portion of the screen. The toolbar may appear only in the lens mode or in other modes as well. The toolbar contains buttons 620 for changing the magnification level (i.e., zooming in or out), a button 630 for switching between full-screen and lens mode, and an options button 640 for displaying the configuration dialog box 650. The configuration dialog box 650 contains more extensive configuration options. The configuration dialog box 650 includes a similar control 660 for changing the magnification level, as well as options 670 for changing how the magnified view behaves (e.g., focus following, cursor following), an option 680 for inverting colors (e.g., a useful visual aid for vision-impaired users), and controls 690 for setting the size of the magnified view lens.

In some embodiments, the magnifier movement system displays the drag control even when the magnifier is in a full screen mode. As described herein, the magnifier may take up the entire display (showing only a portion of the screen). To see other areas of the screen, the user moves the magnified area to other portions of the screen. The magnifier movement system may display a drag control that, when selected, causes the system to move the magnified area based on the user's movement of the input device. For example, the system may display the drag control at the center of the screen and allow the user to grab it and move the magnified area.

In some embodiments, the magnifier movement system accelerates and decelerates the movement of the magnified view. For example, if a user grabs the drag control and swings the pen in one direction, the magnified view may continue moving in that direction once the user lifts the pen from the screens surface and then slowly roll while decelerating to a complete stop. The speed at which the pen leaves the screen and the total length of the dragging pan motion are taken into consideration when determining the length and time of the continued rolling—or if rolling will occur at all. In some embodiments, the system calculates the speed used to determine rolling as 0.6 times the speed between the last two points plus 0.4 times the previous speed. Thus, the system considers previous points, but weights the most recent ones more heavily. In some embodiments, if the user performs the panning motion below a certain velocity, rolling will not occur. For example, if the speed of pan motion is 100 pixels per second or less, rolling will not result when the user lifts the pen. Note that the length of the user's stroke may not matter whereas the speed of the stroke affects the speed and distance the page rolls once the user lifts the pen. The system may cap the total rolling time to a certain value (e.g., 500 ms).

In some embodiments, the magnifier movement system modifies the cursor to indicate that the user has selected the drag control. For example, the system may change the cursor to a panning hand when the user hovers of the drag control, and the system may change the cursor to a closed-fisted panning hand when the user clicks or taps on the drag control. Changing the cursor gives the user a visual indication of the behavior the user can expect if the user selects the drag control.

From the foregoing, it will be appreciated that specific embodiments of the magnifier movement system have been described herein for purposes of illustration, but that various modifications may be made without deviating from the spirit and scope of the invention. Accordingly, the invention is not limited except as by the appended claims.

We claim:

1. A computer system for selecting a displayed area to magnify, the system comprising:
    a display device configured to present a graphical display and a magnified view of a portion of the graphical display;
    a memory; and
    a processing unit, wherein the memory and the processing unit are respectively configured to store and execute instructions that, in response to being executed:
        receive a user input representing a position on the graphical display;
        determine a type of an input source via which the user input was received, the determination indicating whether the user input was a pen input, a stylus input, and/or a touch input, or whether the user input was a mouse input;
        in response to a determination that the received user input was the pen input, the stylus input, and/or the touch input:
            present the magnified view with an associated drag control;
            receive an indication of an actuation of the presented drag control; and
            move the magnified view such that the magnified view magnifies another portion of the graphical display in response to the indication of the actuation of the presented drag control; and
        in response to a determination that the received user input was the mouse input, present the magnified view without the associated drag control.

2. The computer system of claim 1, wherein the instructions also determine the type of the input source via an invocation of an operating system application-programming interface (API).

3. The computer system of claim 1, wherein in response to the determination that the received user input was the mouse input the instructions also:
    receive another user input representing another position on the graphical display;
    determine that the other received user input is the mouse input; and
    in response to the determination that the other received user input is the mouse input, enable movement of the magnified view without presentation of the drag control.

4. The computer system of claim 1, wherein the instructions also:
    determine that the position on the graphical display matches coordinates of a user interface element as presented in the magnified view; and
    actuate the user interface element.

5. The computer system of claim 1, wherein the instructions also:
    pass additional received inputs to one or more applications presented in the magnified view in response to determinations that the additional received inputs are not actuations of the drag control.

6. The computer system of claim 5, wherein the instructions also:
    convert coordinates representing the position on the graphical display from coordinates associated with the magnified view to coordinates associated with an underlying portion of the graphical display that is represented in the magnified view; and
    pass the converted coordinates to the one or more applications as indications of the additional received input.

7. The computer system of claim 1, wherein the instructions also:
    receive configuration information via a user configuration interface; and
    modify responses to the user input based on the configuration information.

8. The computer system of claim 1, wherein the user input and the indication of the actuation are received via a touch screen.

9. The computer system of claim 1, wherein:
    the instructions also determine a varying panning rate that decelerates as the magnified view approaches the other portion; and
    the instructions that move the magnified view move the magnified view to the other portion based on the determined varying panning rate.

10. The computer system of claim 1, wherein the display device is also configured to present the magnified view as a window that appears in a desktop environment of an operating system.

11. A method of magnifying portions of a graphical display, the method comprising:
    presenting, on a display device, a graphical display and a magnified view of at least a portion of the graphical display;
    receiving a first user input representing a position on the graphical display;
    determining a type of an input source via which the first user input was received, the determination being whether the first user input was at least one of a pen input, a stylus input, or a touch input, or whether the first user input was a mouse input;
    in response to a determination that the first user input was at least one of the pen input, the stylus input, or the touch input, presenting a visible drag control element, wherein the visible drag control element enables:
        the magnified view to be changed to magnify another portion of the graphical display in response to receipt of a second user input indicative of a movement of the visible drag control element; and
        a third user input directed to actuation of a user interface element presented in the graphical display to be distinguished from the second user input that is indicative of the movement of the visible drag control element; and
    in response to another user input, enabling another magnified view to be changed without presentation of the visible drag control element, wherein the other user input was the mouse input.

12. The method of claim 11, wherein the method further comprises:
    receiving the other user input, wherein the other user input represents another position on the graphical display; and determining that a type of the input source of the other user input was the mouse input.

13. The method of claim 11, wherein the method further comprises:
   passing the third user input to an application displayed in the magnified view.

14. The method of claim 13, wherein passing the third user input to the application includes:
   converting coordinates associated with the third user input to coordinates associated with an underlying portion of the graphical display represented in the magnified view; and
   passing the converted coordinates to the application as an indication of the third user input.

15. The method of claim 11, wherein the visible drag control element is presented outside of and adjacent to the magnified view.

16. A computer-readable storage device having instructions stored therein for performing operations that control magnification of a portion of a graphical display, the operations comprising:
   presenting, on a display device, the graphical display and a magnified view of the portion of the graphical display;
   receiving a first user input representing a position on the graphical display;
   determining a type of an input source via which the first user input was received, the determination indicating whether the first user input was at least one of a pen input, a stylus input, or a touch input;
   in response to a determination that the first user input was at least one of the pen input, the stylus input, or the touch input, presenting a visible drag control element, the visible drag control element facilitating a change to the portion of the graphical display depicted in the magnified view in response to receipt of a second user input indicative of a movement of the visible drag control element; and
   in response to another user input, enabling a portion of another graphical display depicted in another magnified view to be changed without presentation of the visible drag control element, wherein the other user input was the mouse input.

17. The computer-readable storage device of claim 16, wherein the operations further comprise:
   receiving the other user input, wherein the other user input represents another position on the graphical display; and
   determining that a type of the input source of the other user input was the mouse input.

18. The computer-readable storage device of claim 16, wherein the operations further comprise:
   receiving a third user input representing another position on the graphical display, the other position not being associated with the visible drag control element; and
   passing the third user input to an application depicted in the graphical display.

19. The computer-readable storage device of claim 18, wherein passing the third user input to the application includes:
   converting coordinates associated with the third user input to coordinates associated with an underlying portion of the graphical display depicted in the magnified view; and
   passing the converted coordinates to the application as an indication of the third user input.

20. The computer-readable storage device of claim 16, wherein a location of the visible drag control element relative to the magnified view is dependent upon the portion of the graphical display that is magnified in the magnified view.

* * * * *